United States Patent [19]

Ross et al.

[11] Patent Number: 5,352,871

[45] Date of Patent: Oct. 4, 1994

[54] SYSTEM AND METHOD FOR JOINING PLASTIC MATERIALS

[76] Inventors: James B. Ross, 18775 Devon Ave., Saratoga, Calif. 95070; Dexter C. Tight, Jr., 590 Menlo Oaks Dr., Menlo Park, Calif. 94025; Charles W. Tinsley, 386 Madison Dr., San Jose, Calif. 95123; Hideki Kasa, Moso-Umemachi, both of Sakai-City, Osaka, Japan

[21] Appl. No.: 657,996

[22] Filed: Feb. 20, 1991

[51] Int. Cl.$^5$ ............................................... H05B 6/10
[52] U.S. Cl. .................................. 219/633; 219/634; 219/674; 219/676; 285/41; 156/272.4; 156/380.2
[58] Field of Search ................ 219/10.53, 8.5, 9.5, 219/85.11, 10.73, 10.79, 10.71, 633, 634, 674, 676, 670; 156/272.4, 274.2, 379.6, 380.2; 285/41

[56] References Cited

U.S. PATENT DOCUMENTS

| | | |
|---|---|---|
| 2,739,829 | 3/1956 | Pedlow et al. |
| 3,125,132 | 3/1964 | Knisely. |
| 3,134,406 | 5/1964 | Freundlich et al. |
| 3,218,384 | 11/1965 | Shaw. |
| 3,353,849 | 11/1967 | Laurizio ................................. 285/21 |
| 3,620,876 | 11/1971 | Guglielmo ............................ 156/272 |
| 4,256,945 | 3/1981 | Carter et al. ...................... 219/10.75 |
| 4,267,865 | 5/1981 | Negro ................................. 140/92.94 |
| 4,687,894 | 8/1987 | Koga et al. ......................... 219/10.71 |
| 4,694,131 | 9/1987 | Ino et al. ............................ 219/10.79 |
| 4,695,335 | 9/1987 | Lyall ................................... 156/379.7 |
| 4,914,267 | 3/1990 | Derbyshire ......................... 219/85.18 |
| 5,107,095 | 4/1992 | Derbyshire ......................... 219/10.73 |

FOREIGN PATENT DOCUMENTS

| | | |
|---|---|---|
| WO/80/02124 | 10/1980 | European Pat. Off. . |
| 0402200 | 12/1990 | European Pat. Off. . |
| 802282 | 12/1950 | Fed. Rep. of Germany . |
| 1086426 | 8/1960 | Fed. Rep. of Germany . |
| 3217300 | 11/1983 | Fed. Rep. of Germany . |
| 1493562 | 9/1967 | France . |
| 2439930 | 5/1980 | France . |
| 45-31380 | 12/1970 | Japan . |
| 60-32632 | 2/1985 | Japan . |
| WO-81-02405 | 9/1981 | PCT Int'l Appl. . |
| 8402098 | 6/1984 | PCT Int'l Appl. . |

Primary Examiner—Philip H. Leung

[57] ABSTRACT

The invention provides a system and method for joining plastic members including induction heaters fabricated from a conductive wire coated with a ferromagnetic material and providing ratios of at least 4 to 1 between the areas over the spaces between wires and the area of the wires surrounding the open spaces; the heaters being located preferably between plastic members to be joined. The heaters may be located adjacent the two ends of a plastic connector adapted to receive a pipe in at least one and probably two ends with the heaters being activated preferably by induction heating to produce welding of the plastics to one another. One form of heater is fabricated on a hollow cylindrical mandrel having helical grooves in which the wire is wound and having radial holes arranged in axially extending rows spaced circumferentially about the mandrel so the axially extending wires may be spot welded to the wires in the helical grooves at each hole. Rings of wire may also be held together by axially extending grooves. Saddle fittings and patches may also be applied to pipes or other plastic members employing such heaters. Induction coils in the form of clamshell and jaw-like structures may be employed as appropriate to energize such heaters and flexible coil structures may also be employed.

21 Claims, 4 Drawing Sheets

SYSTEM AND METHOD FOR JOINING PLASTIC MATERIALS

The present invention relates to a system and method for joining plastic materials and more particularly to a system and method for joining a plastic pipe to another plastic pipe, a saddle, a patch or other plastic structure.

Numerous patents have issued over the years on various apparatus and methods for joining plastic pipes. The most common have resistance heater wires embedded in the inner surface of a sleeve to fit over the two pipes to be joined. The pipes are inserted into the sleeve usually into abutment with one another, the heaters being spaced from the region of abutment by a predetermined distance.

Upon heating of the wires, the adjacent regions of the sleeve and pipes are softened to the point of fusion whereby the plastic of the pipes and sleeve are joined. Essentially the same approach is employed for saddles and patches except conventional means are employed to hold the elements in intimate contact prior to completion of the fusion process.

U.S. Pat. No. 2,739,829 takes a slightly different approach using induction heating as opposed to resistance heating. A strip of metallic material is placed between a sleeve and pipes to be joined at two locations spaced from the abutment region of the two pipes. A coil connected to an ac source is employed to heat the metallic straps to produce fusion of the plastic of the sleeve with the plastic of the pipes.

A very similar arrangement is disclosed in International Publication No. WO 80/02124 to Haxey Engineering Ltd.

In both of these documents a problem arises in that the areas of fusion are too small and the joints are readily peeled apart or break loose under shear. The problem arises from the fact that the material of the more common plastics employed for pipes, polyethylene, polypropylene, polytetrafluorethylene, etc., do not bond to metal. Thus large areas of contact between the pipes and the metals must be avoided. A counter requirement is that the metallic member must be quite thin to prevent excessive demagnetizing (edge) effects at the edges of the perforations. In consequence, not much heat is available at the edges of the perforations and as such the perforations must be quite small to permit fusion to occur throughout the area of the perforation. Further use of ferromagnetic materials alone has been found to provide a relatively poor heater, one that changes temperature (poor temperature control) under varying ambient conditions and thus can damage the plastic or produce poor welding.

A still further problem with the Haxey publication is the clamshell coil in that the coil is of poor design and has numerous high resistance connections and thus the system is inefficient. Also, the unit is not suitable for field use over long periods due to the connections becoming fouled.

BRIEF DESCRIPTION OF THE PRESENT INVENTION

The system and method of the present invention employs a ferromagnetic covered wire of copper or like conductive material. The wire is formed into a spiral with cross members, a plurality of widely spaced rings also with cross members, a mesh of widely spaced wires forming, unusually large squares, and the like. Where a saddle fitting is to be attached to a pipe the wire is wound in a flat or pancake-like circular, elliptical or rectangular configuration with radial or cross wires and a central open space so as not to interfere with the communication between the saddle and the main pipe. With a patch an open space mesh of 2.25 mm × 0.10 mm open rectangles, for instance, may be employed.

In any event the heater behaves like a flat plate heater and due to the fact that the ferromagnetic material surrounds the wires, demagnetizing (edge) effects are not present. Further the arrangement of a ferromagnetic on copper wire behaves as set forth in U.S. Pat. No. 4,256,945, temperature regulation is excellent and occurs incrementally along the wires so that temperature is uniform throughout. One further advantage stems from the fact that in most instances the wires are round and thus heat radiates equally in all directions so that uniform heating is achieved.

The net result of the above features including the use of cross wires is that the spacing between wires may be quite large and a very effective bond is achieved that readily withstands shear and peel forces. Area ratios of 4:1 of space to wire are acceptable but the greater the ratio the better the weld over a wide range of ratios. Also the wire employed permits temperature regulation over a very great range of ambient conditions. In one instance it has been found that the temperature of the heater remained nearly constant over input wattages of 100 to 2000.

The spiral with cross members may be formed by winding the wire in a spiral groove on the surface of a hollow cylindrical mandrel. The mandrel has radially extending holes arranged in a plurality of axially extending rows spaced about the circumference of the helical threads whereby when the wire is wound in the spiral grooves, cross wires may be spot welded to the spiral at each of the holes in axially extending rows. The wire cage thus formed is threaded off of the mandrel; that is, unscrewed from the mandrel.

Other types of wire structures are also available such as interleaved sawtooth-like individual wires which form a sleeve that resembles an open weave "Chinese handcuff" or the like.

Wires having ferromagnetic coverings of different Curie temperatures may also be employed to provide temperature profiles along the heater. The wires may be embedded in long tapes which can be cut into appropriate lengths as needed.

Ohmic connection to the heaters may also be employed but are not as convenient as the use of inductive coupling.

A hollow cylindrical coupler for joining two pipes may include two of the wire cages or mesh at locations removed short distances to each side of the region of contact between the two pipes. The coupler may, in one embodiment, be formed by injection molding plastic over a core pin on which the wire cages are disposed. The pressure of the molding process insures that the wire cage remains adjacent the inside surface of the coupler. The wire cage or structure may be buried in the connector but the best results are achieved with the wire structure located on the inner face of the connector. After the plastic sets the core pin(s) may be withdrawn, the cages being molded in the surface of the coupler.

In use, pipes to be joined are inserted into opposite ends of the coupler and a clamshell induction coil is disposed about the coupler and excited so as to induction heat the wire cages and produce fusion of the coupler to the pipes between the widely spaced wires of the cage.

A novel design of clamshell coil is provided wherein there are only two conductive cross connections between the multiple turns in each half of the clamshell halves. The coils of the clamshell are arranged such as to produce a solenoid-like, that is, essentially axial field and thus produce maximum flux coupling to the wire cage or mesh.

Where a saddle is to be attached to a pipe, a pair of jaw-like members are employed having a curvature in a plane including a line drawn from the pivot along the adjacent edges of the jaws, the curvature conforming to the curvature of the pipe. The coils in each jaw are interconnected by only one conductor and are wound such that a magnetic field is developed that expands and collapses relative to the adjacent edges of the jaws in a plane perpendicular to the pivot axis of the jaws.

If a patch is to be applied, a heater such as described above or a wide open mesh may be employed, the mesh embedded within or disposed along the inner or outer surface of the patch. Induction or ohmic heating may be employed with a clamp causing the patch to conform to the surface of the pipe as it is heated by the wire mesh. The patch may be pre-curved but in some instances this is not necessary.

OBJECTS OF THE INVENTION

An object of the present invention is to provide a system and method of joining or patching plastic members, such as plastic pipes and fittings, which system and method produce strong welds in tension, shear and peel.

It is another object of the present invention to provide a heater member of a ferromagnetic coated conductor, such as copper, formed into an open network of circular wires interconnected by cross members to provide large areas of open space between the wires.

It is yet another object of the present invention to provide a method of making a helical array of wires wherein the wire is wound on a threaded outer surface of a hollow cylindrical mandrel having rows of circumferentially spaced axially extending rows of radial holes for accommodating one electrode of a spot welder; cross members of wire being welded to the helically wound wire at each of the holes.

It is another object of the present invention to provide a method of making a wire structure which is relatively quick, quite easy to manufacture and permits of automated manufacture.

Another object of the present invention is to provide a wire structure comprising a plurality of independent rings of wire joined by axially extending members.

It is still another object of the present invention to provide a clamshell coil structure wherein coils are formed in each jaw and are interconnected by only two conductors, the coil producing a solenoid type magnetic field upon connection to an ac source.

Another object of the present invention is to provide a saddle fitting incorporating a wire structure according to the present invention by which unusually strong welds of the saddle to a pipe are achieved.

Yet another object of the present invention is to provide a plier-like set of jaws carrying coils of wire or strip conductors interconnected by only one conductor, the jaws being employed to heat a relatively flat heater embedded in a saddle to be joined to a pipe.

The above and other features, objects and advantages of the present invention, together with the best means contemplated by the inventors thereof for carrying out their invention will become more apparent from reading the following description of a preferred embodiment and perusing the associated drawings in which:

DETAILED DESCRIPTION OF THE PRESENT INVENTION

Figure 1:
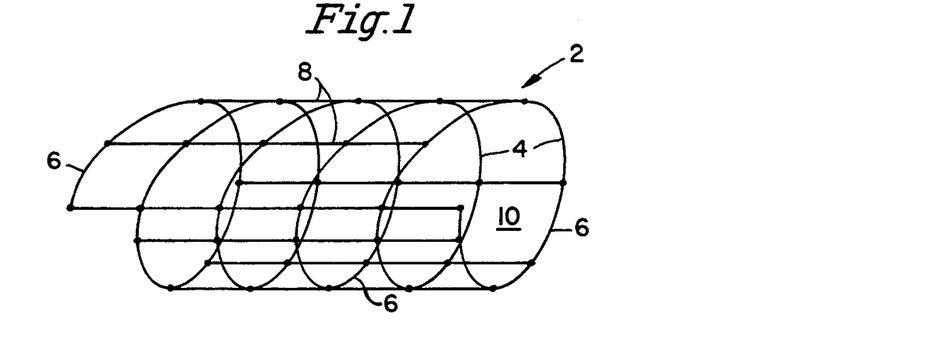
FIG. 1 illustrates in perspective a helically wound wire cage of the present invention.
Figure 6:
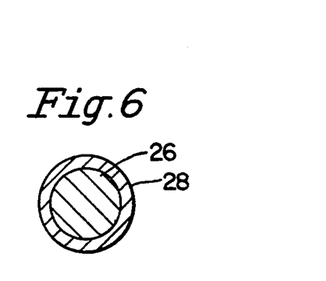
FIG. 6 illustrates in cross section the wire employed in the structures of FIGS. 1-4.

Referring now to FIG. 1 of the accompanying drawings, a wire cage 2 constituting one form of a heater of the invention is formed of a spiral 6 of wire 4 of the type illustrated in and described relative to FIG. 6 of the accompanying drawings. Cross wires 8 extending axially of the helix and are welded or otherwise secured to the helix 6 wherever the wires 8 cross the turns of the spiral 6.

In a first typical example at high frequencies the wire diameter is 0.5 mm, the diameter of the coil is 43 mm, the spacing between the turns of the helix is 2.25 mm and 12 cross wires are employed. The cage is 27 mm long. Thus the area of each area between the wires is 25.3 mm$^2$, whereas the wire area is inconsequential. Ratios of as little as 4:1 are acceptable but a ratio of at least 10:1 is preferred.

For a two inch IPS connector for joining two inch pipes (see FIG. 5) a wire cage is 61.5 mm in diameter, it has about 18 cross wires, it is 34 mm in length. The wire and turn spacings are as above.

At low frequencies the wire diameter is about 0.76 mm and all other dimensions are the same. The number of cross wires, in this case 12 and 18, is not critical; the number being a function primarily of strength of the coil and to some extent the requirements of current flow along the paths parallel to the axis of the coil.

It is apparent from the above that the open areas of the coil which, as becomes apparent subsequently, define the regions of fusion between the members to be welded, are fully sufficient to provide the bonding between adjacent members to prevent shear and peel failure.

Figure 2:
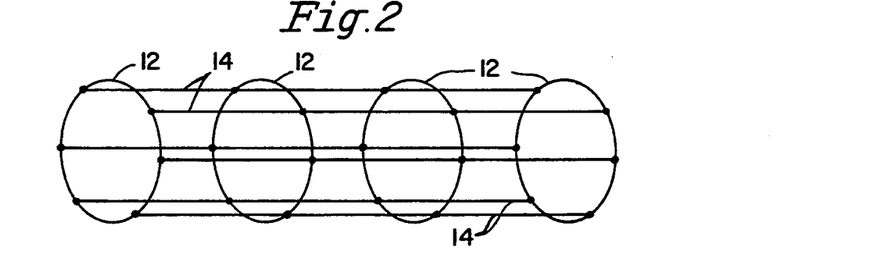
FIG. 2 illustrates a wire cage formed of rings of wire and interconnecting cross wires.

Referring now specifically to FIG. 2 of the accompanying drawings, a plurality of rings of wire 12 are spaced from one another and are held together by cross wires 14. The effect of this arrangement so far as operation in the system is about the same as the structure of FIG. 1. The structure of FIG. 1, however, is simpler to manufacture and lends itself more readily to automated manufacturing techniques.

Figure 3:
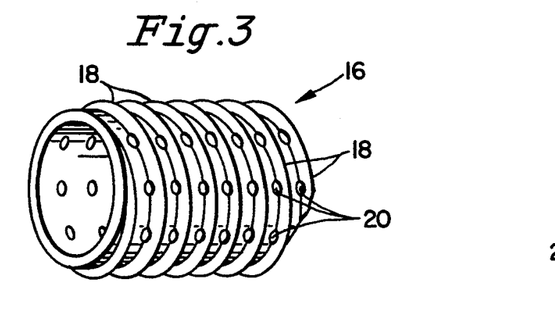
FIG. 3 illustrates a mandrel employed in fabricating the wire cage of FIG. 1.

FIG. 3 illustrates a mandrel 16 employed to fabricate the wire cage of FIG. 1. The mandrel 16 has a surface with threads 18 formed therein. The process of manufacture involves winding a helix of wire 6 in the threads 18 and cross wires 8 are then welded to the wire 6. Welding is accomplished by providing holes 20 in the mandrel where each cross wire 8 is to be welded to the helix of wire 6.

Figure 4:
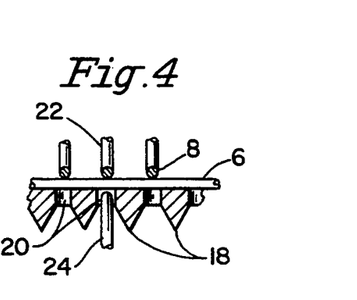
FIG. 4 illustrates the method of employing the mandrel of FIG. 4 to fabricate the wire cage of FIG. 1.

As seen in FIG. 4 electrodes 22 and 24 of a spot welder are brought into contact with wires 8 and 6 respectively, the electrode 24 passing through one of holes 20 to reach into contact with wire 6. Each weld point is welded in its turn until all wires have been welded and then the completed wire cage is removed from the mandrel 16 by rotation to unthread it.

Referring specifically to FIG. 6 of the accompanying drawings, the wire employed in making the heater of the present invention is preferably a copper wire 26 clad with a ferromagnetic material 28 such as Alloy 42. The term "ferromagnetic material" as used herein refers to various iron alloys or other conductive, magnetic materials having a Curie temperature that is above the weld temperature and below the degradation temperature of the various plastic materials employed. Alloy 36 is also a useable nickel-iron based material as are other iron nickel alloys and other material exhibiting Curie temperature characteristics in an appropriate range of temperatures. Copper may be replaced by other highly conductive materials with copper being employed primarily because of its cost and ease of working.

Figure 5:
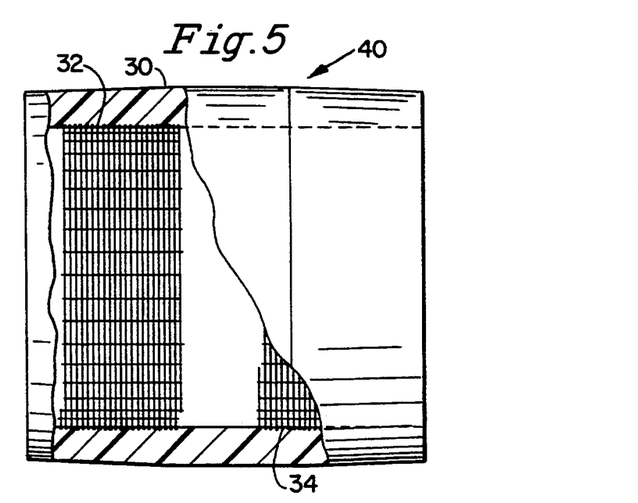
FIG. 5 illustrates in partial breakaway view a connector for connecting plastic pipes and incorporating the wire cage of FIG. 1.

Referring now specifically to FIG. 5 of the accompanying drawings there is illustrated a plastic pipe connector 30 according to the present invention. The connector 30 has two sets of wire cages 32 and 34 spaced from the interface of two pipes 36 and 38 which are to be effectively joined by the connector. The outer surface of the connector 30 has been removed at 40 so that the wire cage 32 may be seen in detail. The cage 32 lies along the inner surface of the connector 30 surrounding the pipe 36. Upon heating by an induction coil discussed below, the wire rises to its effective Curie temperature usually at least 10° to 30° F. below the thermal degradation temperature of the plastic involved. A constant current supply is used to excite the induction coils, and as the temperature approaches effective Curie temperature, the temperature of the heater falls until the coating on the wire again becomes highly magnetically permeable and heating is resumed. Thus the temperature of the heater stabilizes at about the effective Curie temperature of the heater and weld of the pipes to the connector 30 is achieved.

As previously indicated, the wire cage can be embedded in the connector adjacent the connector's inner surface by injection or extrusion molding the connector about the wire cage. Pulse extrusions may also be employed as well as heat shrinking a plastic down around the wires. Other molding techniques may also be used.

The induction coil employed in the present invention is a clamshell like device 43 having a coil wound on the inner surface of each half of the shell. Specifically an induction coil apparatus 42 and reference is made to FIG. 7 of the present application, comprises pivotal halves 44 and 46 generally rectangular in all three planes with each having semicircular grooves 48 and 50 having longitudinal axes parallel to a hinge 52 joining the two halves. Conductors 58 are laid in the semicircular grooves transverse to the axis of the grooves and are interconnected such that a magnetic field is created that extends axially of the grooves.

Figure 8:
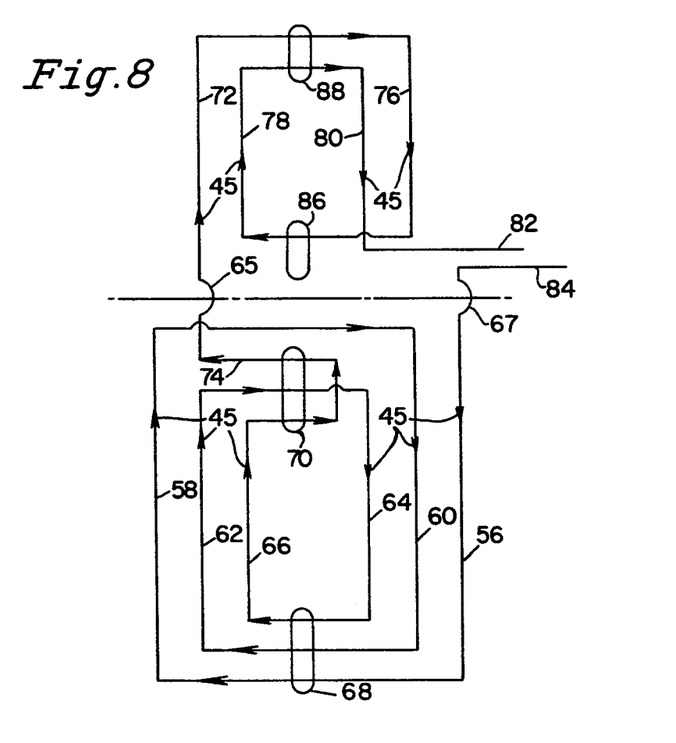
FIG. 8 is a diagram of the winding of the coils of the device of FIG. 7.

Specifically currents carried in a conductor 54, see FIG. 8 for details, are connected to conductor 56 which is connected to a conductor 58 thence to conductors 60 and thus to conductors 62, 64 and 66 in that order. All of conductors 56 to 66 are located in the semicircular region 48 of the half of the device 43. Connections between the conductors 56-66 are by means of groups of cross conductors 68 and 70 which cause the currents in the conductors 56, 60 and 64 to be opposite in direction to the currents in conductors 58, 62 and 66. Conductor 66 is connected to a conductor 72 located in the semicircular region 50 of member 46 by means of a conductor 74. Connection between conductors 66 and 72 is by means of a loop 65 of conductor to prevent undue stressing of the material upon opening and closing of the jaws. The conductors 84 and 56 are also interconnected by a loop 67 of conductive material. Conductor 74 is connected to a conductor 76 and the progression is conductors 78, 80 and 82. A conductor 84 is noted as the input line and conductor 82 as the output line although in ac these reverse each half cycle. The conductors 72, 78 and 82 are interconnected with conductors 76 and 84 by means of cross conductors 86 and 88. The groups of conductors 68, 70 and 86 and 88 are illustrated as applied to flat surfaces of the device 43 where the members 44 and 46 abut. These conductors could be located within the semicircular regions 48 and 50 and in some instances are.

Figure 7:
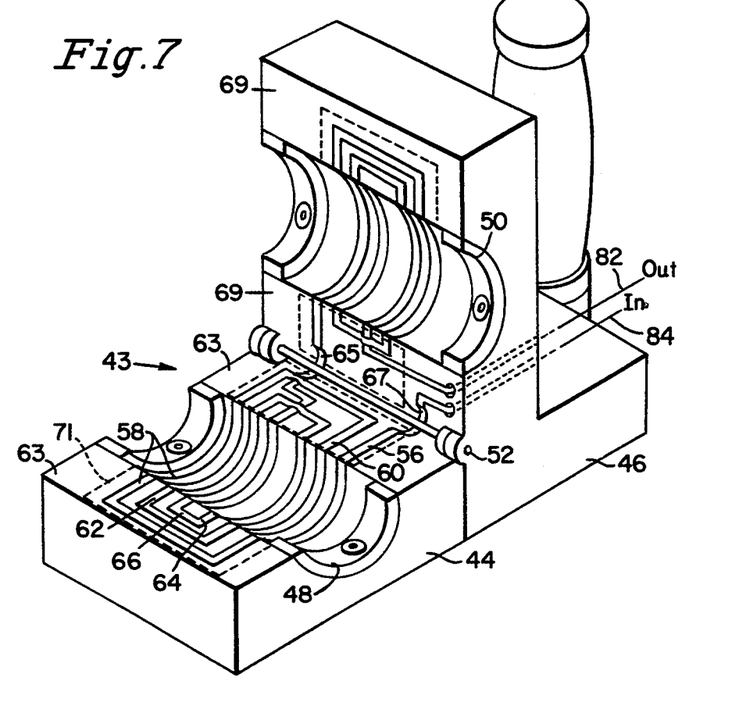
FIG. 7 is a view in perspective of a clamshell coil structure employed in the system of the present invention.

It will be noted that the currents, as indicated by the arrows 45 on each conductor except the conductors parallel to the hinge are shown in the unfolded position of the clamshell in FIG. 7, as being in the same direction. When the upper member 46 is rotated down onto the lower member 44 the currents appear to be in opposite directions but in fact give the effect of a continuous conductor (a solenoid coil) and thus produce a strong axial field. The conductors on the abutting flat surface, however, carry currents in opposite directions to produce bucking, i.e., canceling fields, to limit magnetic radiation at large distances from the clamshell particularly at high frequencies and reduce the requirement for shielding.

The conductors of FIG. 7 may be flat copper or like strips or cooled tubing for use at the higher frequencies such as 13.56 MHz and may be solid copper or preferably Litz wires or the like at the lower frequencies such as power line frequencies.

Abutting surfaces 63 and 69 of the members 44 and 46 have a TEFLON or like film laid over the cross conductors on the faces 63 and 69 to prevent arc-over or short circuiting. These films are indicated by dashed lines on each of the abutting surfaces, these being designated by reference numeral 71 on all such surfaces.

Figure 9:
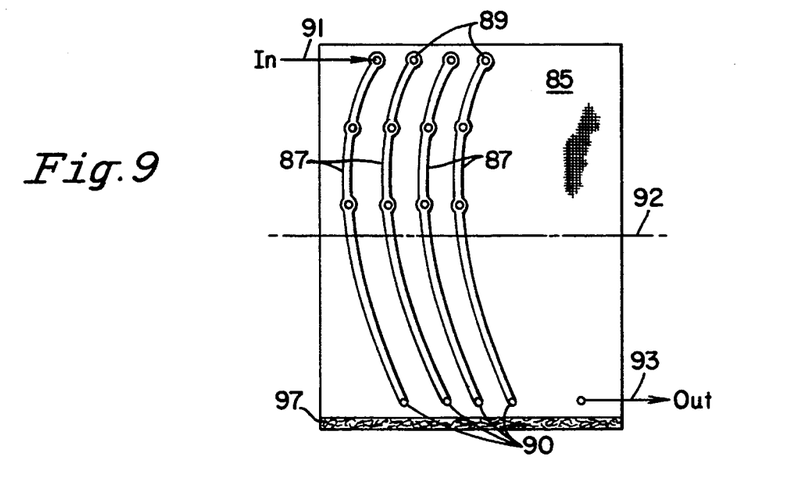
FIG. 9 illustrates a modified form of a coil structure employed in the system of the present invention.

A further coil arrangement is provided in FIG. 9 hereof. In this embodiment, a flexible wire structure is disposed on a flexible non-conductive backing 84. The arrangement is intended to permit coils to be disposed about pipes or the like of different sizes.

Specifically, the wire structure comprises a plurality of curved conductors 86 which at the top terminate in plated through holes 88; that is, holes in the backing material each of which has conductive material in contact with its associated conductor 86 and extending through the holes to the back of the material 84. The plated through holes may be provided by conductive grommets.

The other or bottom end of the conductors 86, as viewed in FIG. 9, terminates in conductive studs 90 having an OD that is snugly received within the holes 88. The lower half of the conductors 86 are curved relative to the curvature of the upper half of the conductors such that upon folding the material 85 about centerline 92, the stud 90 of the left most conductor 87 enters the hole 89 of the conductor 87 immediately to its right, all as viewed in FIG. 9. This fact is true relative to all of the conductors 87 so that upon wrapping the material 85 about a pipe or the like a continuous spiral of conductive material is formed. Thus upon the application of a constant current across terminals 91 and 93, a magnetic field is formed that closely approaches the field produced by the structure of FIG. 5.

The grommets or studs of FIG. 9 may be replaced by metallic snaps or Velcro may be employed to assist in securing the member about an object when the grommets and studs are employed. Conductive Velcro may also be employed.

Figure 10:
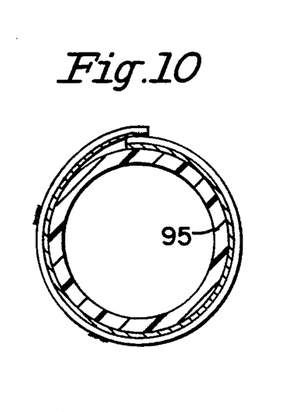
FIG. 10 is a side view of the structure of FIG. 9 hereof in a looped position.

Referring to FIG. 10 of the accompanying drawings the member 84 is wrapped about a pipe 95. Velcro 97 is disposed across the bottom of member 85 as illustrated in FIG. 9 and along the back of each conductor so that the Velcro strip may be placed in contact with varying locations whereby the diameter of the loop may be varied. Grommets or snaps may be placed at each of these locations for such purpose. The upper and lower halves of the member 85 are offset from one another as other than the upper and lowermost sets of snaps, etc. are employed but the magnetic field produced is not materially affected by such offset.

Figure 11:
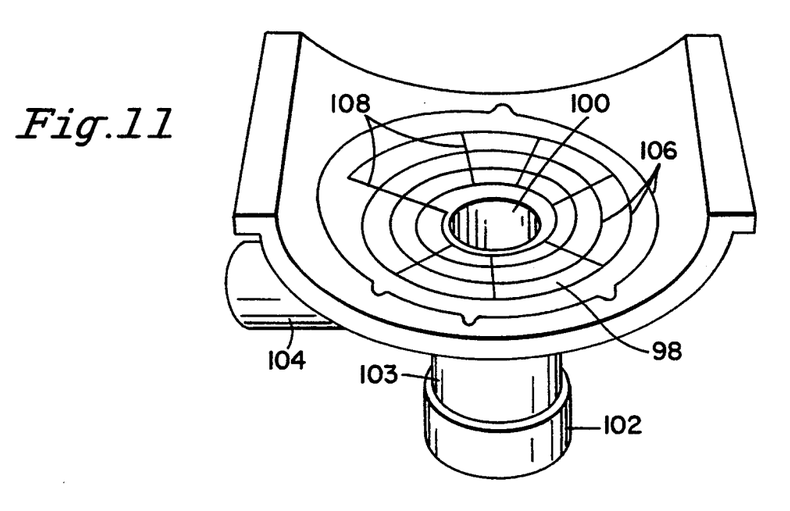
FIG. 11 is a perspective view of a saddle for attachment to provide a side entry into a pipe.

Referring now specifically to FIG. 11 of the accompanying drawings there is illustrated a saddle fitting according to the present invention for providing a side entry into a pipe.

A saddle fitting designated by reference numeral 96 is of conventional design except for the provision of a heater 98 which may be wound circularly or elliptically about passage 100 that provides access into a pipe to which the saddle is to be joined. The wire structure may also be any of the essentially flat wire structures of the present invention. The passage 100 also provides the opening into a pipe 104 (side arm) of the saddle. A cap 102 is located on the end of a pipe 103. A hole is drilled in the pipe either before or after the saddle is applied whereby entry is provided from the pipe through passage 100 to side arm 104 which is taken off of pipe 103.

The heater 98 is illustrated as a helix of wire 106 of the same type as described relative to FIG. 6. Crosswires 108 may be provided primarily for physical integrity and provides more uniform current flow. Any of the other wire structures of the present invention may be employed.

In operation the saddle fitting is placed on a pipe to be entered and the heater is energized preferably by induction heating employing the coil structure of FIG. 11 hereof.

The wire structure of the saddle fitting may be incorporated in the structure by the various processes described herein above. Further the coil may be formed, placed in correct position on the saddle fitting and energized to heat the plastic while the heater is pressed against the saddle to embed the heater therein.

Figure 12:
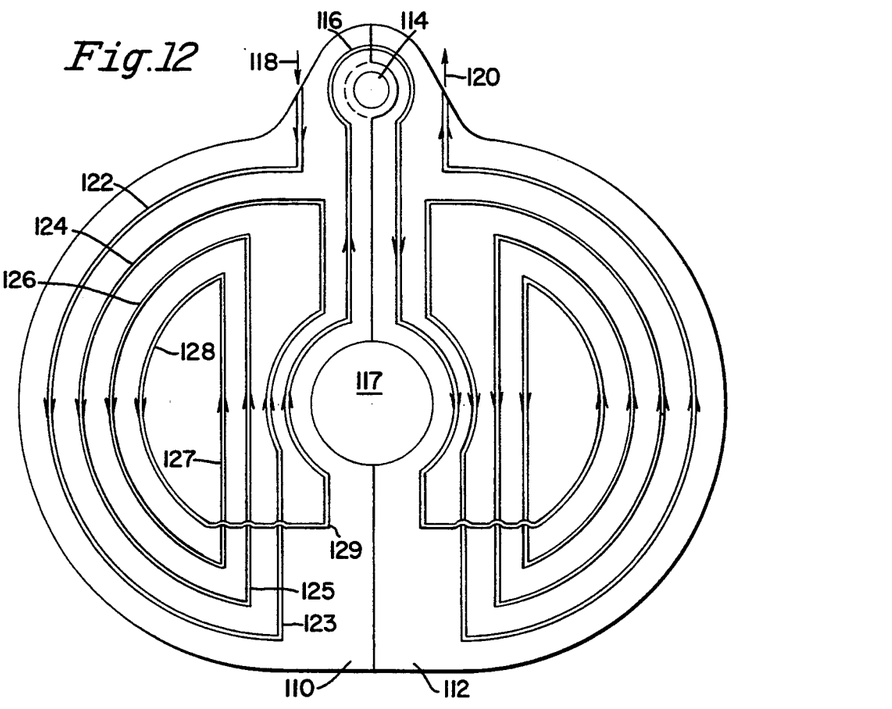
FIG. 12 is a plan view of a pair of jaws and coil structure for use with the saddle valve of FIG. 10.

Referring specifically to FIG. 12, the coil structure is formed on a pair of jaws 110 and 112. The jaws are pivoted together by pivot pin 114 and only a single electrical crossover 116 is provided between the jaws; access to the coils being adjacent the pivot whereby the wires from the coils of the two jaws are immediately adjacent one another. Each jaw is generally semicircular and has a semicircular opening 117 in the plane of the jaw to permit the jaws to be closed about pipe 103. The jaws have their diametrical surfaces in contact with one another when the jaws are in place about pipe 103 between pipe 104 and the pipe to which the saddle fitting is to be attached. The jaws are curved in a plane perpendicular to the page and at right angles to the diameters of the jaws, the curvature being such as to fit the pipe to which the saddle is to be joined. Flat jaws may also be employed but are not as efficient as the curved jaws.

Current is brought into the jaws on lead 118 to jaw 110 and on lead 120 to jaw 112. Current flows in, for instance, on a conductor 122, there being four conductors 122, 124, 126 and 128 on jaw 110. The conductors 122, 124, 126 and 128 are connected to conductors 123, 125, 127 and 129, respectively, these latter conductors lying close to the hole 117. Coils associated with jaw 112 are mirror images of those of jaw 110 with currents flowing in opposite directions in the coils of the two jaws.

Upon application of alternating current across leads 118 and 120 a magnetic field is established that links the turns of the coil 98 to produce heating and cause the saddle to be fused to the pipe. Again the windings of the heater provide large areas of contact between the saddle and the pipe whereby strong bonds are formed.

Figure 13:
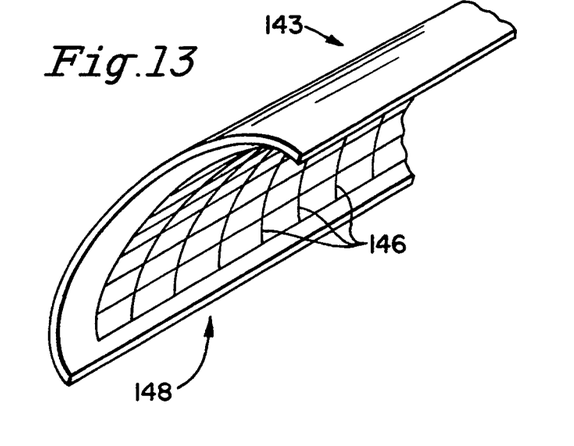
FIG. 13 illustrates a patch that may be employed to repair a damaged pipe or other plastic member.

Referring now specifically to FIG. 13 of the accompanying drawings there is illustrated a patch 143 for plastic pipes according to the present invention. The patch comprises a piece of plastic 144 curved if a pipe is to be repaired to conform to the curvature of a pipe to be patched and of a longitudinal and arcuate length adequate to provide the strength of the bond of the patch to the pipe to insure proper repair.

The inner circumference of a major region of the patch has embedded in the surface a network of wires 146, of the type illustrated in FIG. 6 hereof. The wires may be a wire mesh 148 of cross wires with an area between wires of, for instance, 0.225 mm$^2$.

The tool of FIG. 7 may be employed even though a complete circle of wires is not provided, the interconnections of the mesh of FIG. 12 providing the necessary electrical continuity for current to flow and heat the wires. The mesh may also be ohmically connected.

The patch may initially be flat and under pressure from the coil structure while being heated may be made to conform to the pipe to be patched. Alternatively the patch may be extruded over the mesh 148 with the desired curvature.

The power supply employed is preferably a constant current supply so that relatively sharp temperature regulation is achieved since P=KR when the current is constant. The resistance of the wire drops materially upon the wires approaching their effective Curie temperature, the effective Curie temperature being from 1° to 100° below absolute Curie temperature depending upon the material employed. The ferromagnetic does not have to become paramagnetic to produce the desired results it only has to have its permeability reduced sufficiently to produce a sharp drop in resistance of the wires.

The term "constant current" as used herein is defined by the equation $$\frac{\Delta |I|}{|I|} \leq -\tfrac{1}{2}\frac{\Delta |R|}{|R|}$$

where I is current and R is the resistance of the circuit. So long as the above equation is true the system performs as stated. Preferably a truly constant current is preferred, such producing the best possible temperature regulation. In the present invention it is necessary to control temperature so that the plastics are not damaged in the welding operation. Constant current supplies that may be employed are disclosed in U.S. Pat. Nos. 4,626,767 and 4,758,864, assigned to the same assignee as the present invention.

Figure 14:
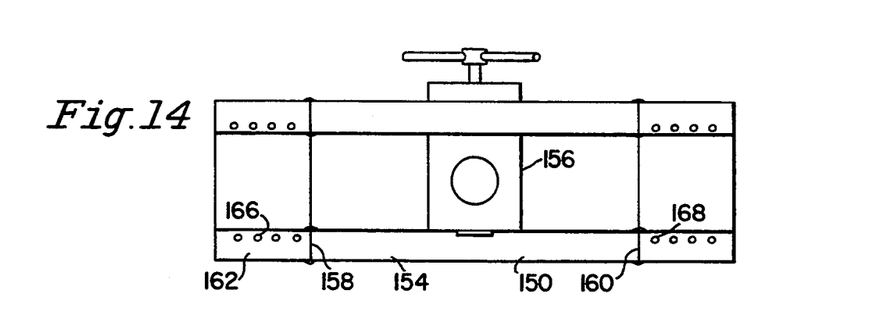
FIG. 14 is a side view in elevation of a system for inserting a valve between an existing pipe system or pipe system under construction.

Referring now specifically to FIG. 14 of the accompanying drawings there is illustrated a system for installing a valve 150 in a pipe 152. The valve 150 is inserted in a pipe 150 by socket fusion, the pipe 150 providing a short length of pipe on either side of the valve, reference numerals 154 and 156. Pipes 162 and 164 provide a continuous channel in which the valve 150 is to be located. Pipes 162 and 164 are provided with heater wire structures 166 and 168 according to the present invention. The ends of pipes 162 and 164 are heated upon energization of the heaters to fusion temperatures whereby a butt fusion joint is achieved between the valve pipe and pipes 162 and 164 to complete connection of the valve in the pipe.

Figure 15:
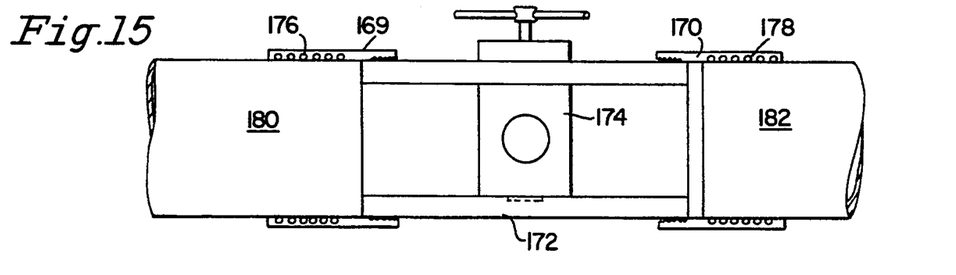
FIG. 15 is a side view in elevation of a different arrangement for inserting a valve in a pipe.

The valve may become equipped with a connector of the type illustrated in FIG. 5 so that the valve may be quickly joined to adjacent pipe ends. Specifically, and reference is made to FIG. 5 of the accompanying drawings, connectors 169 and 170 which may be of the type illustrated in FIG. 5 hereof, may be applied at the factory to both ends of a length of pipe 172 containing a valve 174. Thus upon receipt of the assembly in the field or elsewhere it is only necessary to energize heaters 176 and 178 to produce fusion to pipes 180 and 182, respectively, whereby the pipe system may be completed.

Figure 16:
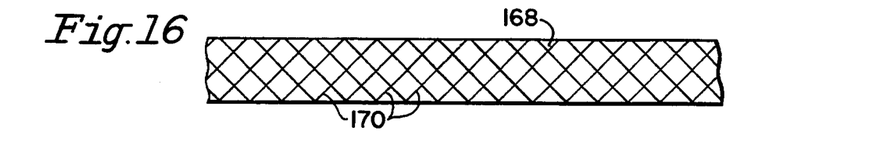
FIG. 16 is a top view of a tape including a loosely wound wire structure constituting a heater.

The heater of the present invention may be incorporated in a tape. The heater may constitute an open weave of wires of the type illustrated in FIG. 6. Referring specifically to FIG. 6 of the accompanying drawings, an elongated tape 184 may have mastic on one side so that it may be wrapped about or interiorly of a member to be heated or between members to be heated. The tape includes wires 186 loosely woven to form a continuous length of heater that may be excited inductively or ohmically.

The wire as indicated is a conductive wire surrounded by a ferromagnetic material. The depth of the ferromagnetic material is not critical but preferably should not exceed two skin depths and may be less than one as defined by the following formula:

$$S.D. = 5030\sqrt{\frac{\rho}{\mu f}} \text{ cm,}$$

where $\rho=$ resistivity of the ferromagnetic material, $\mu$ is its effective permeability and $f$ is the frequency of the source. In one example of the wire employed the skin depth is less than one.

Once given the above disclosure, many other features, modifications and improvements will become apparent to the skilled artisan. Such features, modifications and improvements are, therefore, considered to be a part of this invention, the scope of which is to be determined by the following claims.

What is claimed is:

1. A system of joining plastic materials comprising
   a wire structure providing many large open spaces between the wires,
   said wire structure having wires with a ferromagnetic material,
   a first plastic member,
   a second plastic member to be welded to a said first plastic member,
   said wire structure being located between said plastic members and in contact with both said plastic members, and
   a coil structure adapted to be energized by a source of alternating current,
   said system including,
   a clamshell device having a pair of members secured to one another by a pivotal axis and each having a semi-cylindrical depression with an axis parallel to the pivotal axis,
   each said depression having a plurality of parallel wires perpendicular to the pivotal axis and a plurality of wires arranged parallel to the pivotal axis in first and second groups of an equal number of wires,
   interconnections between the wires in each of the groups associated with a different one of said members being such that currents in the two groups flow in opposite directions upon the pair of members being positioned one upon the other,
   a first interconnection between one of said wires of said first of said spaced wires in each of said members, and
   a second interconnection between one of said wires of said second of said spaced wires in each of said members to provide a continuous electrical path in each of said members.

2. The system of claim 1 wherein
   said wires having a Curie temperature between the melt temperature and the degradation temperature of said plastic members.

3. The system according to claim 1 or claim 2 wherein
   said wire structure incorporates wires having different Curie temperatures.

4. The system according to claim 1 or claim 2 further comprising a hollow cylindrical plastic connector sleeve having said wire structures located along its inner diameter.

5. The system according to claim 1 or claim 2 wherein
one of said members is a saddle fitting and
the other of said members is a first pipe to which the saddle fitting is to be joined,
a surface of said saddle to contact said pipe having a curvature about an axis parallel to the axis of said pipe equal to the outer diameter of said pipe,
said saddle having a further pipe that terminates at one end in the surface to contact said first pipe to define a hole in said surface,
a wire structure surrounding said hole, and
means for heating said wire structure to approach the Curie temperature of said wire.

6. The system according to claim 5 wherein said wire structure is elongated in the circumferential direction of the surface of said pipe.

7. The system according to claim 1 or claim 2 wherein one of said members is a patch for closing a break in another plastic member,
said patch having said wire structure embedded in a surface thereof that is to contact the member to be repaired,
said surface conforming to the configuration of the surface to be repaired.

8. The system according to claim 1 wherein the ratio of each open spaces between said wires and the area of the wires surrounding each open area is at least 4 to 1.

9. The system according to claim 1 wherein said wire structure comprises
a helix of electrically conductive wires having a plurality of circumferentially spaced, longitudinally extending cross members secured physically and electrically to the turns of said helix.

10. The system according to claim 1 wherein said wires structure comprises
a plurality of generally circular electrically conductive rings and
a plurality of longitudinally extending, circumferentially spaced cross wires physically and electrically connected to said rings.

11. The system according to claim 1 or claim 9 or claim 10 wherein
said wire structure is embedded in a structure of one of said plastic members which surface contacts the other of said plastic members.

12. The system according to claim 1 or claim 2 or claim 9 or claim 10 wherein said wires are generally round in cross section.

13. A heater comprising a structure having a plurality of physical and electrically interconnected wires,
said wires comprising in cross section a conductive material surrounded by a ferromagnetic material,
said wires being spaced from one another to define spaces therebetween such that the area of the spaces between said wires is at least approximately ten times the area of the wires defining the space in the same plane as the wires defining the area,
said plurality of interconnected wires includes a wire helix and
a plurality of longitudinally extending circumferentially spaced wires secured to the turns of said helix.

14. A heater comprising a structure having a plurality of physically and electrically interconnected wires,
said wires comprising in cross section a conductive material surrounded by a ferromagnetic material,
said wires being spaced from one another to define spaces therebetween such that the area of the spaces between said wires is at least approximately ten times the area of the wires defining the space in the same plane as the wires defining the area,
a plurality of generally circular rings formed of round wires and
a plurality of longitudinally extending circumferentially spaced wires secured to said rings.

15. A coil structure comprising
a clamshell device having a pair of members mateable with one another and each having a semi-cylindrical depression having a common axis,
each said depression having a plurality of parallel conductors perpendicular to the common axis and arranged in first and second groups of a number of conductors,
interconnection between the conductors in each said group associated with one of said members being such that currents in the two groups flow in opposite directions,
a first interconnection between one of said conductors of said first member and one of said conductors in the other of said members, and
a second interconnection between a different one of said conductors of said second of said members and a different one of said conductors in the other of said members.

16. The coil structure according to claim 15 wherein
the interconnection between the conductors of said members being such that current flows in opposite directions in diametrically opposed conductors.

17. A saddle fitting for making a side entry into a plastic pipe comprising
a surface to contact a plastic pipe having a curvature equal to the surface to which the saddle fitting is to be connected,
said saddle fitting having a further pipe that terminates at one end in said surface of said saddle fitting to define a hole therein,
a structure of wires surrounding said hole,
said wires comprising in cross-section a conductive material surrounded by a ferromagnetic material, and
means adapted to heat said wires to approach their Curie temperature,
said Curie temperatures lying between the melt temperature and the degradation temperature of the material of the plastic pipe to which the saddle fitting is to be connected.

18. A saddle fitting according to claim 17 wherein said means comprises a pair of jaws hinged to one another,
said jaws when closed defining a hole centrally thereof to permit said jaws to encircle said pipe,
coil windings disposed on said jaws about said hole in a pattern to produce a magnetic field linking said wire structure.

19. A coil structure comprising
a flexible, non-conductive sheet of material,
a plurality of flexible electrical conductors disposed on said sheet and extending from adjacent one edge to adjacent an opposed edge thereof,
said conductors having first and second ends,
said conductors having a configuration in the plane of said sheet such that upon folding said sheet about its centerline between said edges the second end of various of said conductors contacts the first end of an immediately adjacent conductor to provide a continuous electrically conductive path through said conductors.

20. A coil structure according to claim 19 further comprising fasteners for securing said second ends of said conductors to said first ends of said adjacent conductors.

21. A coil structure according to claim 19 comprising means for securing said second ends of said conductors to said adjacent conductors intermediate said ends.

* * * * *